May 23, 1967   A. G. SEIFRIED ET AL   3,320,638
GLOVE MACHINE
Filed June 2, 1965   5 Sheets-Sheet 2
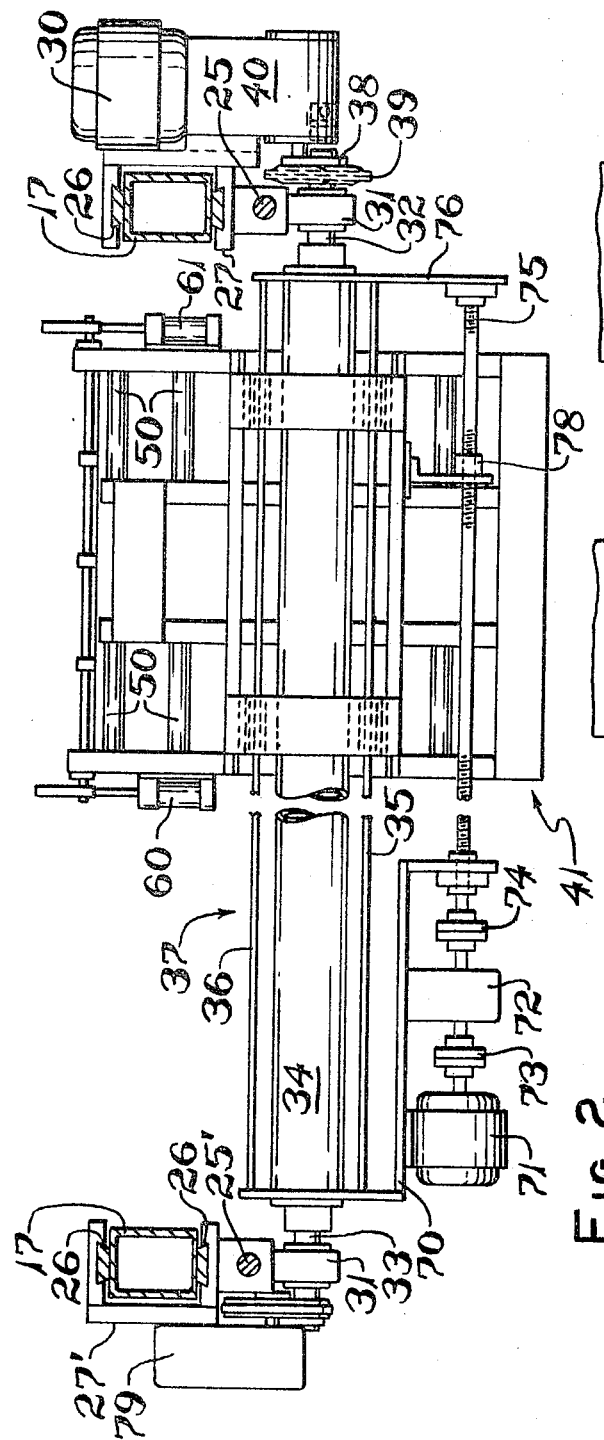
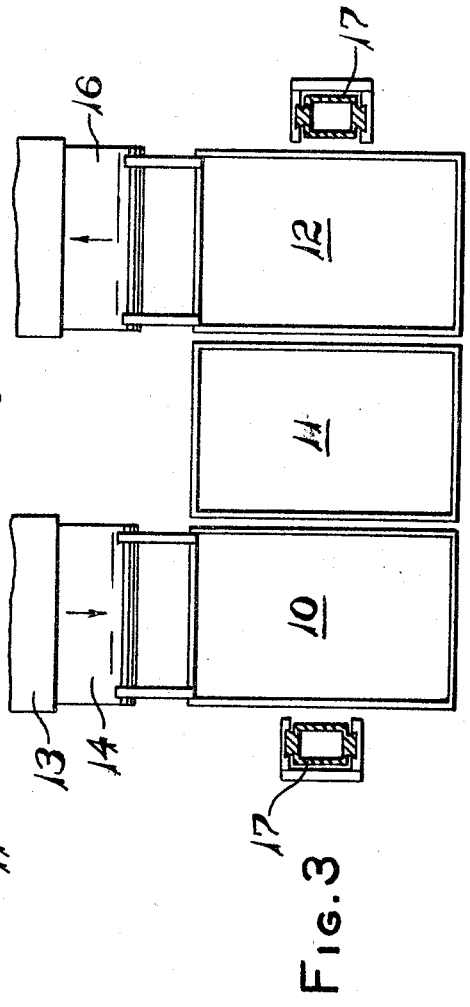
INVENTORS
ANTON G. SEIFRIED
DONALD B. RUPPEL
NORMAN E. REINHART
BY Joseph Januszkiewicz
ATTY.

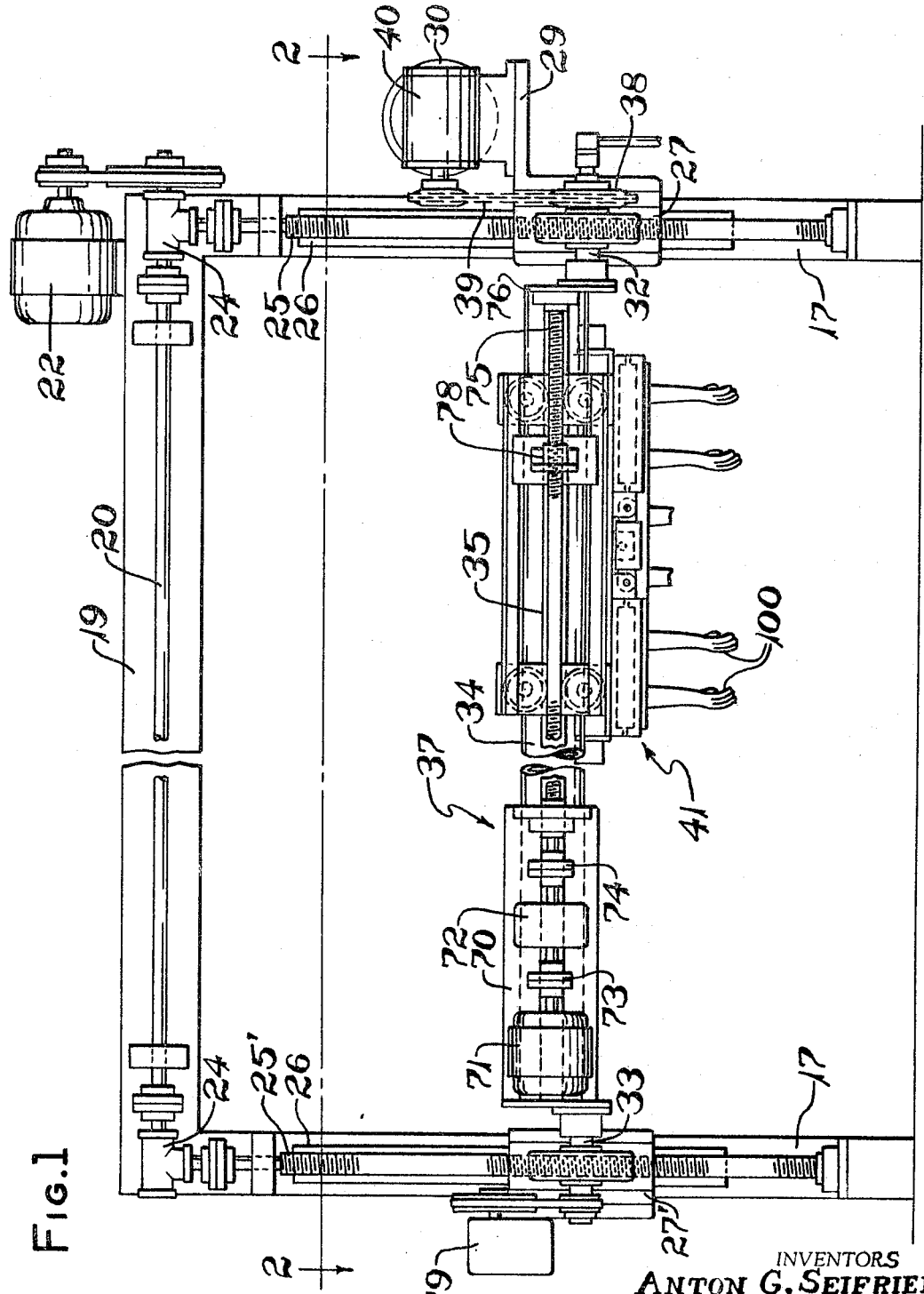

May 23, 1967   A. G. SEIFRIED ETAL   3,320,638
GLOVE MACHINE
Filed June 2, 1965   5 Sheets-Sheet 3
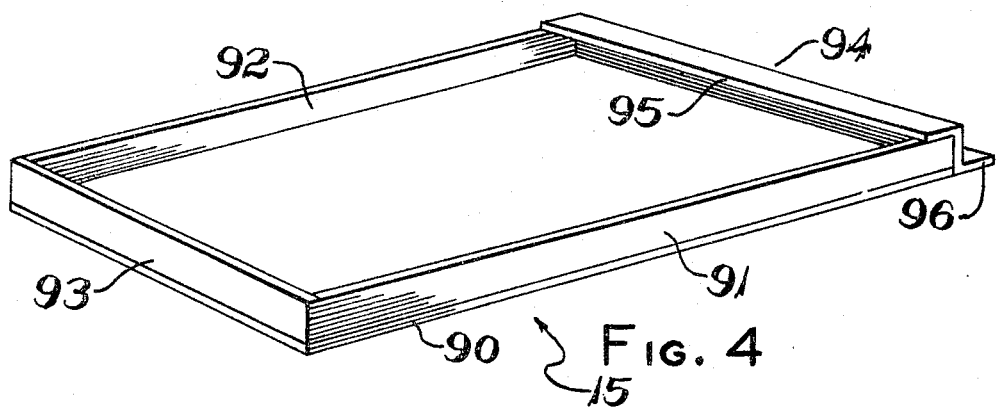
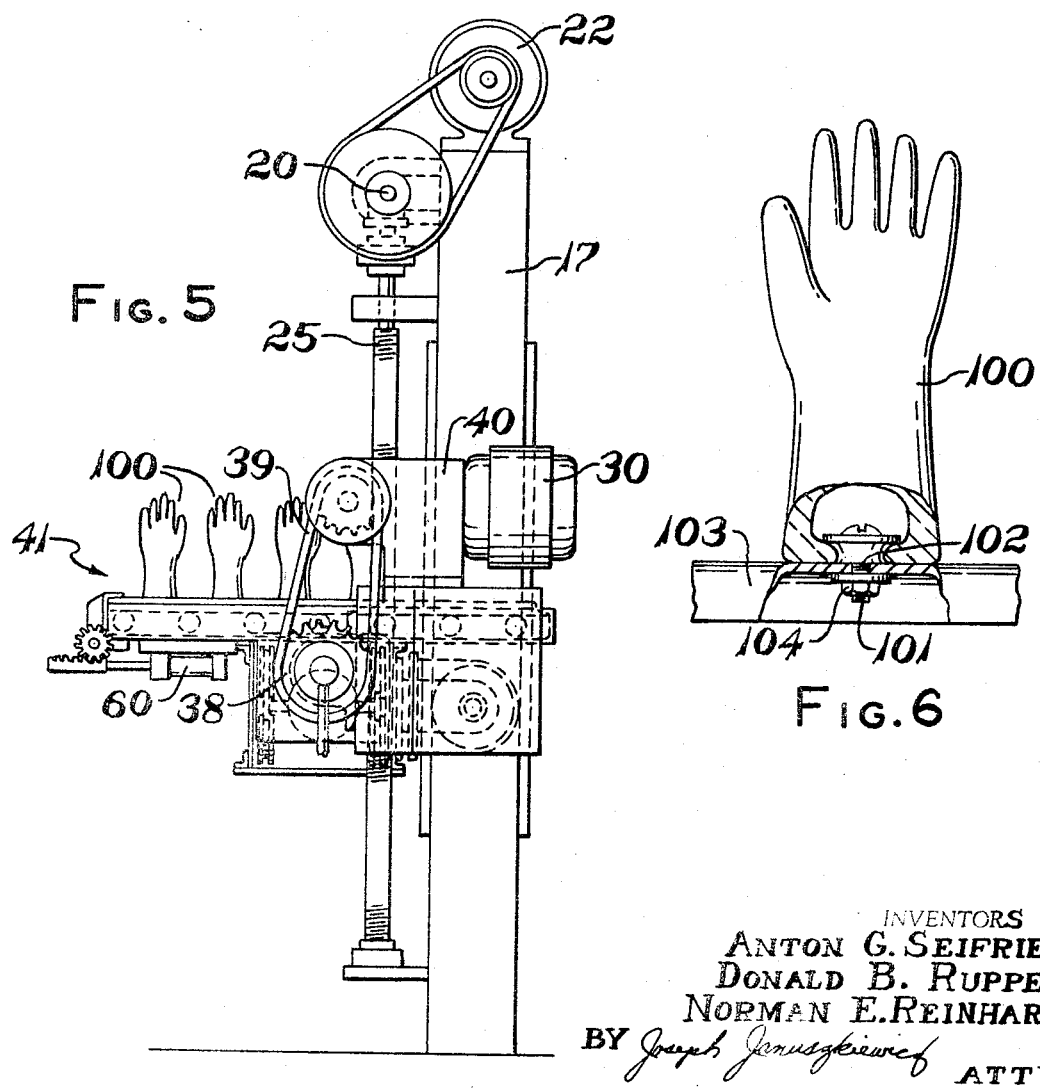
INVENTORS
ANTON G. SEIFRIED
DONALD B. RUPPEL
NORMAN E. REINHART
BY Joseph Januszkiewicz
ATTY.

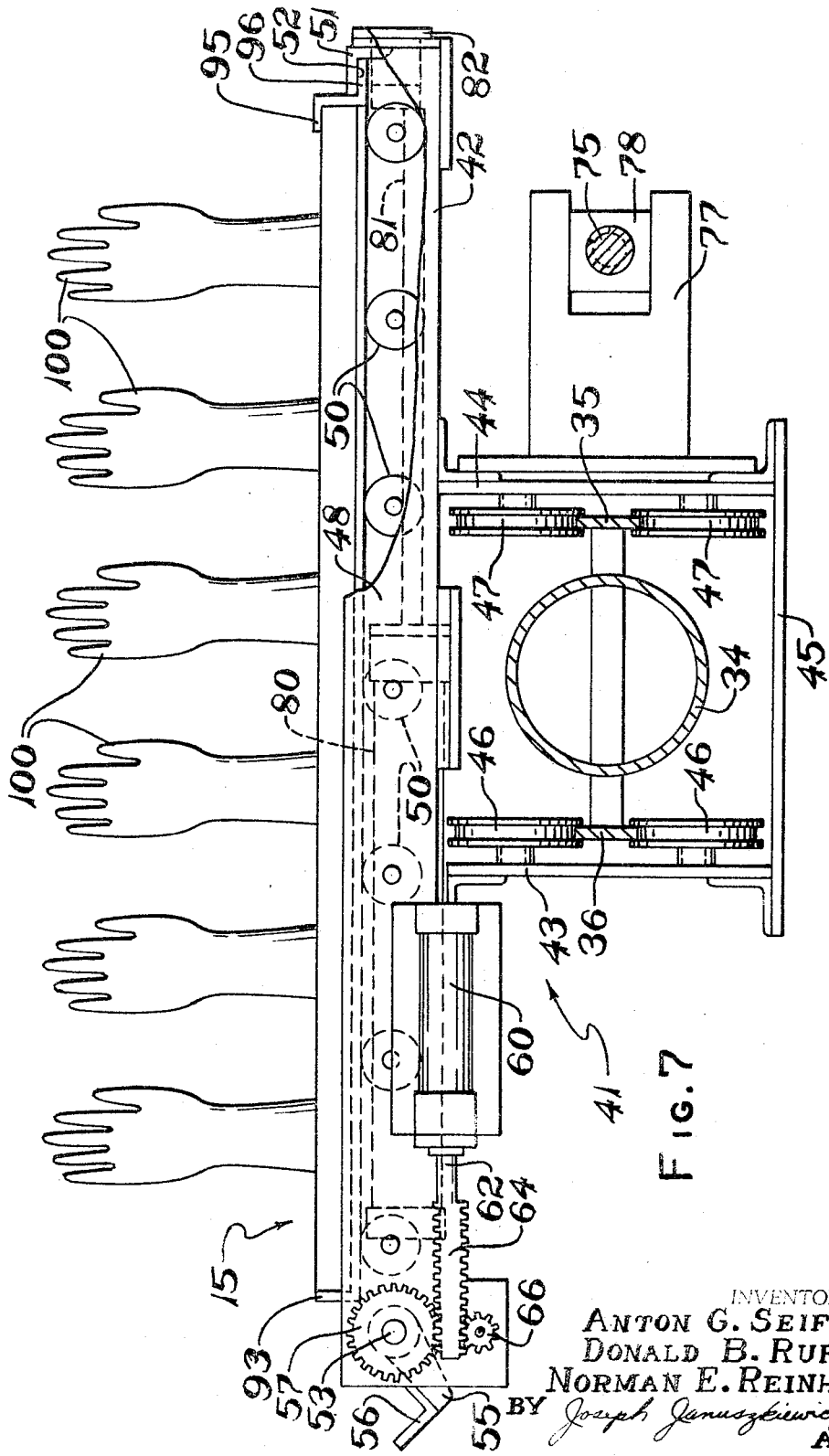

INVENTORS
ANTON G. SEIFRIED
DONALD B. RUPPEL
NORMAN E. REINHART
BY Joseph Januszkiewicz
ATTY.

United States Patent Office 3,320,638
Patented May 23, 1967

3,320,638
GLOVE MACHINE
Anton G. Seifried, Akron, and Donald B. Ruppel and Norman E. Reinhart, Cuyahoga Falls, Ohio, assignors to The B. F. Goodrich Company, New York, N.Y., a corporation of New York
Filed June 2, 1965, Ser. No. 460,726
7 Claims. (Cl. 18—24)

This invention relates to the manufacture of dipped rubber goods and more particularly to a new and improved apparatus for economically manufacturing latex rubber gloves such as surgical gloves.

Heretofore, in the manufacture of rubber dipped articles, considerable hand operations were essential to their manufacture thereby making the unit cost high. In certain instances an operator was necessary for each manipulative step wherein such manual handling would vary the consistency and the quality of article produced.

Thereafter, the trend had gone to the individual manipulations of a form as it was conveyed along a continuous chain; however, such required complex motions with intricate mechanisms and related parts.

The general purpose of this invention is to provide an apparatus which is simple in construction and operation yet which apparatus materially increases the production of a consistent quality latex dipped product while simultaneously reducing the production cost.

The present invention contemplates the use of a carriage movable along a movable and pivotable boom which operates to raise and lower pallets on the carriage into and out of a coagulant tank as well as a latex tank to manufacture a latex glove.

An object of this invention is to effect economies in the manufacture of latex dipped products.

Another object of this invention is to provide a dipping apparatus which increases the rate of production of latex gloves.

Another object of this invention is to provide an automatic glove dipping apparatus which eliminates manual operation throughout the complete cycle of manufacture.

A further object of this invention is to provide an automatic glove manufacturing apparatus that is simple in construction and operation.

A further object of this invention is to manufacture economically a high quality surgeon's glove.

These and other objects achieved by this invention will become apparent as this description proceeds in connection with the accompanying drawings.

FIG. 1 is a front elevational view of the glove dipping apparatus showing the carriage in an inverted position.

FIG. 2 is a plan view of the glove dipping apparatus taken along line 2—2 of FIG. 1.

FIG. 3 is a plan view of the dip tanks showing the spaced standards in cross section, and portions of the delivery and discharge conveyor.

FIG. 4 is an isometric view of the pallet which receives the straps with the glove forms for mounting on the carriage.

FIG. 5 is a side elevational view of the glove dipping apparatus.

FIG. 6 is an enlarged elevational view of the glove form mounted on a longitudinally extending strap, which strap is shown in cross section.

FIG. 7 is a side elevational view of the glove dipping carriage mounted on the boom of the glove dipping apparatus showing a longitudinally extending strap mounted in a pallet.

Figure 8:
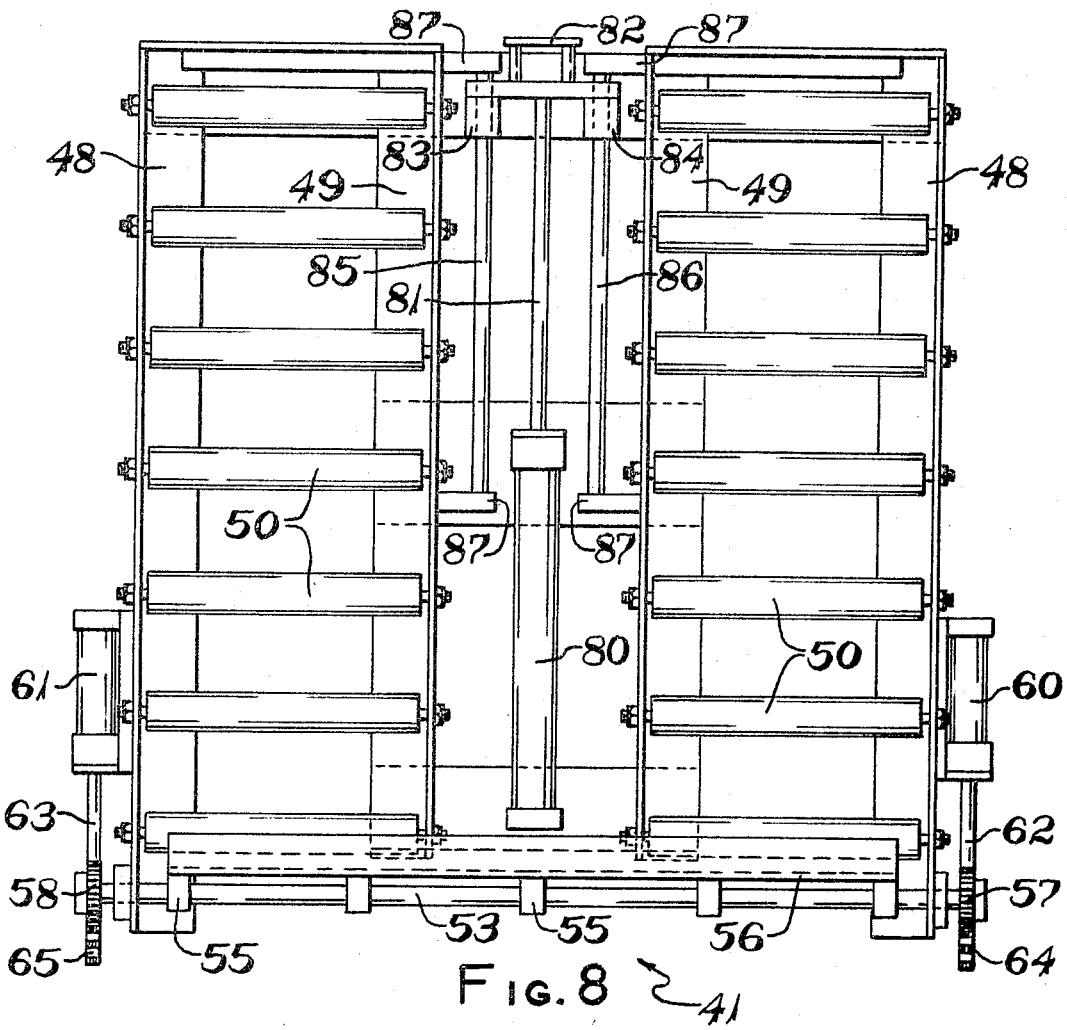
FIG. 8 is a plan view of the carriage which travels on the boom and receives the pallet with the glove forms.

Referring now to the drawings, wherein like reference characters designate like or corresponding parts throughout the several views, there is shown in FIG. 3 a coagulant tank 10, and a pair of adjacent latex tanks 11 and 12. The coagulant tank 10 is located adjacent to a preheat furnace indicated at 13. A horizontal driven roll conveyor 14 emerges from the preheat furnace 13 to deliver a pallet 15 (FIG. 4) to the glove dipping apparatus to be described. A discharge conveyor 16 facilitates the removal of the pallets 15 from the glove dipping apparatus for removal to a washing, drying and curing process. FIG. 3 discloses a pair of spaced standards 17 which are secured to a suitable base frame.

The upper ends of the standards 17 are connected by a cross beam 19 which has journalled thereon for rotation a longitudinally extending drive shaft 20. A drive motor 22, mounted on cross beam 19, is suitably connected to one end of the drive shaft 20 to rotate such shaft at selective speeds in a manner well known in the art. The respective end portions of the drive shaft 20 are connected via suitable right-angle drive means 24 to feed screws 25 and 25' that are suitably journalled on the respective vertically extending standards 17. The vertically extending standards 17 are dovetailed (FIG. 2) to provide ways 26 which slidably guide saddles 27 and 27' thereon. One of the saddles 27 has a horizontally extending bracket 29 (FIG. 1) which serves as a platform for a feed motor 30 suitably secured thereon. The respective saddles 27 and 27' have forwardly extending housings 31 (FIG. 2) which rotatably journal spaced shafts 32 and 33. A longitudinally extending tubular support member 34 has its respective end portions connected to such spaced shafts 32 and 33 for rotation therewith. Tubular support member 34 has a pair of longitudinally extending rails 35 and 36 extending in a generally horizontal direction parallel to the longitudinal center line of such tubular member 34. The respective end portions of the rails 35 and 36 are connected to the tubular member 34 as well as intermediate portions thereof to provide a unitary structure hereinafter referred to as boom 37. The one end portion of shaft 32 is keyed or otherwise suitably connected to a sprocket 38 which is connected via a chain 39 to the output shaft of a transmission 40 which receives its power from feed motor 30. Feed motor 30 is a reversible motor which is adapted to selectively rotate boom 37 in a clockwise or counterclockwise direction for a purpose to be described.

A carriage 41, to be described, is mounted for movement on boom 37. Carriage 41 has a horizontally extending base frame 42 (FIGS. 7, 8 and 9) which has a pair of forwardly disposed depending brackets 43—43 (FIG. 7) and a pair of rearwardly disposed depending brackets 44—44. The lower end portions of brackets 43—43 and brackets 44—44 are secured together by a tie plate 45 to provide rigidity to the structure. As best seen in FIG. 9, each forwardly disposed bracket 43 has a pair of vertically spaced wheels 46—46 which captively secure the carriage 41 to the rail 35 in cooperation with similarly disposed pairs of wheels 47—47 on rearwardly disposed brackets 44—44; however, such wheels 47—47 captively engage rail 36. Such wheels 46 and 47 in cooperation with rails 35 and 36 maintain carriage 41 on the boom 37 in any position of rotation of such boom 37 while permitting its linear movement thereon. Carriage 41 has secured to its respective edge portions longitudinally extending side plates 48—48 and to its respective intermediate portion a pair of spaced longitudinally extending side plates 49—49. A plurality of longitudinally spaced tarnsversely disposed rollers 50 are suitably journalled on adjacent pairs of side plates 48–49. The axes of rollers 50 are generally parallel to the axis of rotation of tubular member 34.

The one end portion of carriage 41 (FIG. 7) has a longitudinally extending angle bracket 51 extending across the rearwardly disposed portion to provide a lip 52 which facilitates the locking of the pallet on the carriage 41 in a manner to be described. The forwardly extending portion of carriage 41 has a longitudinally extending shaft 53 journalled thereon, which shaft 53 has secured to it a plurality of spaced lugs 55. An angle bracket 56 is secured to the respective lugs 55 whereby such angle bracket 56 is rotated by the rotation of shaft 53. The respective end portions of shaft 53 have spur gears 57 and 58 keyed thereto for rotation therewith. Carriage 41 has a pair of hydraulic cylinders 60 and 61 mounted on the respective side portions thereof, which cylinders 60 and 61 have respective pistons 62 and 63 extending forwardly therefrom and connected to forwardly extending racks 64 and 65. Racks 64 and 65 intermesh with the respective spur gears 57 and 58. To insure positive engagement with respective spur gears 57 and 58 by the racks 64 and 65, idler gears 66 and 67 are journalled on the respective end portions of the carriage 41 to provide intermeshing engagement with racks on the lower bottom portion of the respective racks 64 and 65. As viewed in FIG. 7, pressurization of the head end of hydraulic cylinder 60 operates to move piston 62 along with rack 64 in a leftward direction, rotating spur gear 57 in a clockwise direction thereby pivoting angle bracket 56 in a clockwise direction such that the one end portion of such bracket locks the pallet 15 securely within the carriage in cooperation with the lip portion 52 for manipulation thereon.

The one end of boom 37 has a bracket 70 (FIGS. 1 and 2) upon which is suitably mounted a motor 71 and a transmission 72 which are connected by suitable coupling means 73. The output of transmission 72 is connected via coupling means 74 to a lead screw 75 which extends in a longitudinal direction substantially parallel to the longitudinal center line of tubular member 34. The other end portion of lead screw 75 is suitably journalled on a bracket 76 that is attached to the other end portion of boom 37 (FIG. 2). Extending rearwardly from the bracket 44 is a mounting plate 77 to which is secured a nut 78. Nut 78 operatively engages the lead screw 75 and upon rotation of the lead screw 75 effects longitudinal movement of the carriage 41 in accordance with the direction of rotation of such lead screw 75. Closely adjacent to bracket 70 on saddle 27′ is a brake means 79 that cooperates with the motor 30 to insure controlled rotation of boom 37.

Figure 9:
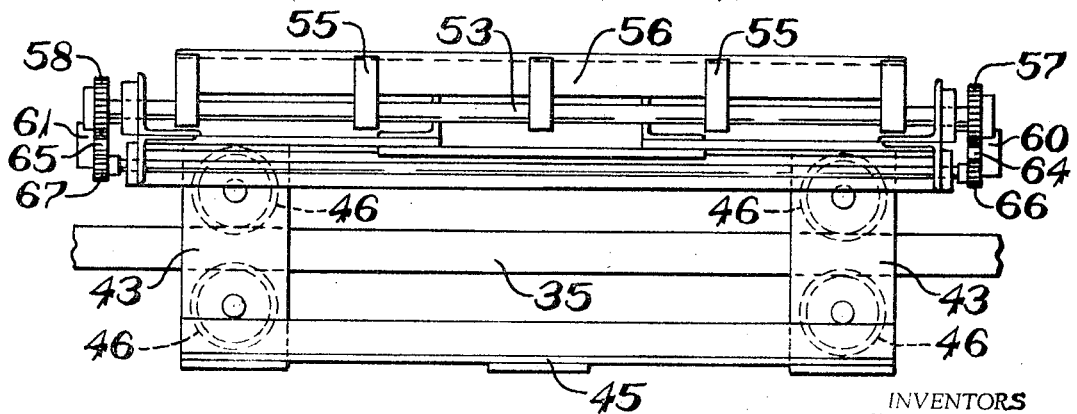
FIG. 9 is a front elevational view of the glove dipping apparatus showing such carriage in unloaded condition.

Secured to the base frame 42 of carriage 41 is a hydraulic cylinder 80 having a piston rod 81 operatively connected to an upwardly extending bracket 82 which, as shown in FIGS. 7 and 8, is adapted to engage the rearwardly-most end portion of the pallet 15 for unloading such pallet from the carriage 41. Bracket 82 and piston rod 81 are secured to a pair of laterally spaced ball bushings 83 and 84 which slidingly engage longitudinally extending guide rails 85 and 86 respectively to facilitate the longitudinal movement thereof. The guide rails 85 and 86 are fastened at their respective end portions to upstanding brackets 87. Pressurization of the rod end of hydraulic cylinder 80 moves bracket 82 downwardly as viewed in FIG. 8 thereby moving the pallet 15 out of the carriage 41 onto the discharge conveyor 16.

Pallet 15 is a rectangular shaped member having a lower plate member 90, pairs of oppositely disposed side members 91 and 92 and a pair of opposed end members 93 and 94. Member 94 is a Z-shaped member having a forwardly extending lip portion 95 and a rearwardly extending lip portion 96, which lip portion 96 is adapted to be engaged by the lip portion 52 of the angle bracket 51 when such pallet is loaded in the carriage 41 as clearly shown in FIG. 7.

Each glove form 100 has a threaded stud 101 secured to the lower end portion which is adapted to pass through a bore 102 on the strap 103. Each glove form 100 is aligned on the straps 103 and secured thereto by a washer and nut 104 or some other similar means.

In the operation of the glove dipping apparatus, after the individual straps are loaded, the straps are placed into the pallets with the thumbs pointed either toward the leading or the trailing edge of the pallet. The lip portion 95 retains the one end of the respective straps in the pallet. The pallet 15 is fed by the conveyor 14 into the carriage 41, substantially into the position shown in FIG. 7. As viewed in FIG. 7, the boom is rotated slightly in a clockwise direction to assure the positioning of the pallet 15 in the carriage 41 so that the lip 52 securely engages the forward end portion or the lip 96 of the pallet. The hydraulic cylinders 60 and 61 are then actuated to pivot the angle bracket 56 into locking engagement with the rearward end protion of the pallet 15, thereby positively locking the pallet 15 and glove forms in the carriage.

The carriage 41 is positioned immediately above the coagulant tank 10, so upon energization of motor 30, boom 37 is rotated to position the glove forms into a downwardly extending position. Motor 22 is then energized to rotate the respective feed screws 25—25 to move the boom downwardly, positioning the glove form into the coagulant tank to the desired depth. The boom is then raised to withdraw the glove forms from the coagulant tank for a short drying period. The carriage is then moved laterally on the boom into position over the latex tank 12 through the energization of motor 71. The boom is again lowered thereby dipping the glove forms to the desired depth in the latex tank. After the required dwell period, the boom is raised through energization of the motor 22 until the carriage 41 is raised to its desired height. The carriage 41 and boom 37 are then rotated in a direction which will put the drops, if any, over the backs of the thumbs through energization of motor 30. The direction of rotation of boom 37 is then reversed, swinging the boom 37 and carriage 41 in sufficient revolutions to dry the latex for further manipulation. The carriage 41 and boom 37 are brought to rest with the carriage in alignment with the discharge conveyor 16. The boom is lowered to facilitate the unloading of the pallet onto such conveyor 16. Hydraulic cylinders 60 and 61 are then pressurized to unlock the pallets on the carriage 41 through the pressurization of the head end of such hydraulic cylinders 60 and 61 to swing the angle bracket 56 in a counterclockwise direction as viewed in FIG. 7. Hydraulic cylinder 80 is then pressurized to move bracket 82 linearly to move the pallet 15 onto the discharge conveyor 16. The head end of hydraulic cylinder 80 is then pressurized to return the bracket 82 to its normal position after which the carriage 41 is moved linearly into alignment with the conveyor 14 preparatory to receiving another loaded pallet 15. If desired, the glove forms may receive a first dip in tank 11 followed by a second latex dip in tank 12.

Various modifications are contemplated and may obviously be resorted to by those skilled in the art without departing from the spirit and scope of the invention, as hereinafter defined by the appended claims, as only a preferred embodiment thereof has been disclosed.

We claim:

1. In a dipping machine, a pair of dip tanks, a dipping apparatus straddling said tanks, conveyor means mounted adjacent said tanks for conveying pallets with glove forms thereon for movement to and from said dipping apparatus, said dipping apparatus having a vertically movable support member mounted thereon, said support member being rotatably mounted thereon for movement about a horizontal axis, means connected to said support member for moving said support member in a vertical direction, means connected to said support member for moving said support member in a vertical direction, a carriage mounted on said support member for reciprocable movement thereon and operative to receive and secure pallets from said conveyor means, said carriage movable with said support member upwardly from said tanks and downward toward said tanks for dipping the glove forms on a pallet located on said carriage into said tanks, means operatively connected to said support member on said dipping apparatus for rotating said support member and said carriage about said horizontal axis to provide a drying action for coagulant and latex deposited on the forms held by said carriage.

2. An apparatus for making latex surgical gloves comprising, a base frame, a pair of spaced support means mounted on said frame, a saddle mounted on each of said support means, drive means on said support means operatively connected to each of said saddles for moving said saddles simultaneously selectively in a vertical or downward direction, a boom having its end portions rotatably mounted on said saddles, motive means mounted on one of said saddles and operatively connected to said boom for selectively rotating said boom about its longitudinal center line, a carriage mounted on said boom for reciprocable movement thereon in said longitudinal direction, and means on said carriage for retaining a plurality of glove forms for sequential dipping into tanks for producing a latex surgeon's glove.

3. An apparatus for making latex surgical gloves as set forth in claim 2 wherein said retaining means comprises clamp means operative between a locking position and an unlocking position for securing a pallet with glove forms thereon for dipping into tanks of solution.

4. A dipping apparatus for making gloves comprising a base frame, a pair of spaced standards mounted on said base frame, a saddle mounted on each of said standards for reciprocable movement thereon, a cross beam extending between said saddles and journalled thereon for rotation about a longitudinally extending axis, drive means operatively connected to said saddles and carriage for rotating said carriage about said axis and for moving said saddle on said standards, a carriage mounted on said cross beam for reciprocable movement thereon in a direction parallel to said axis, motive means on said cross beam operatively connected to said carriage for selectively moving said carriage thereon, said carriage having a pair of spaced guide means for directing a pallet with glove forms thereon onto said carriage, said carriage having a stop member on one end portion thereof cooperative with such pallet to limit the movement thereon and said carriage having a clamping means on the other end portion thereof operative to clamp a pallet thereon in cooperation with said stop member on said carriage.

5. A dipping apparatus for making gloves as set forth in claim 4 wherein said carriage has a movable ejector operative upon actuation to move a pallet out of said carriage.

6. An apparatus for making latex surgical gloves comprising a base frame, a pair of laterally spaced vertically extending columns secured to said base frame with a cross beam therebetween, a saddle mounted on each of said columns for guided reciprocable movement, a boom having its end portions journalled on said saddles for rotation about an axis normal to said vertically extending columns, said boom having a pair of laterally spaced ways parallel to said axis an disposed on opposite sides thereof, first drive means mounted on said columns and operatively connected to said saddles for reciprocating said saddles on said columns in unison, second drive means mounted on one of said saddles and operatively connected to said boom for rotating said boom in either direction about said axis, a carriage mounted on said boom, said carriage having a plurality of spaced rollers rollingly engaging said ways for captively securing said carriage to said boom for movement thereon in a direction parallel to said axis and for rotative movement therewith; third drive means mounted on said boom operatively connected to said carriage for selectively moving said carriage on said boom along said ways, said carriage having a pair of laterally spaced side portions with rollers thereon operative to facilitate the loading of a pallet with glove forms thereon, one end portion of said carriage having a stop member for engagement with such pallet to limit movement thereon, a pivotable clamping plate, means on said carriage operatively connected to said clamping plate for swinging said plate between a locking position and an unlocking position wherein said plate in said locking position cooperates with said stop member to retain such pallet on said carriage as said boom swings said carriage about said axis, and ejection operated means on said carriage having an upwardly extending bracket located adjacent said stop member for operation when said plate is in said unlocking position to eject a pallet from said carriage.

7. In a dipping apparatus for dipping glove forms into a series of tanks comprising, a support frame movably mounted on said dipping apparatus for movement in a vertical direction, said support frame rotatably mounted on said dipping apparatus for movement about a horizontal axis, and a carriage mounted on said support frame for movement thereon in a horizontal direction normal to said vertical direction for positioning said carriage in spaced horizontal positions for conditioning such glove forms for dipping into such tanks.

References Cited by the Examiner
UNITED STATES PATENTS

| | | | |
|---|---|---|---|
| 1,272,348 | 7/1918 | Crawford | 18—24 |
| 1,946,360 | 2/1934 | Roberts | 18—24 |
| 2,041,788 | 5/1936 | Sprunger | 18—24 |
| 2,241,176 | 5/1941 | Boecler et al. | 18—24 |
| 2,288,444 | 6/1942 | Fingado et al. | 18—24 |
| 2,389,319 | 11/1945 | McMordie et al. | 18—24 |

WILLIAM J. STEPHENSON, *Primary Examiner.*